April 4, 1939.  F. J. WILLIAMS  2,152,831
VALVE
Filed Dec. 13, 1937  2 Sheets-Sheet 1
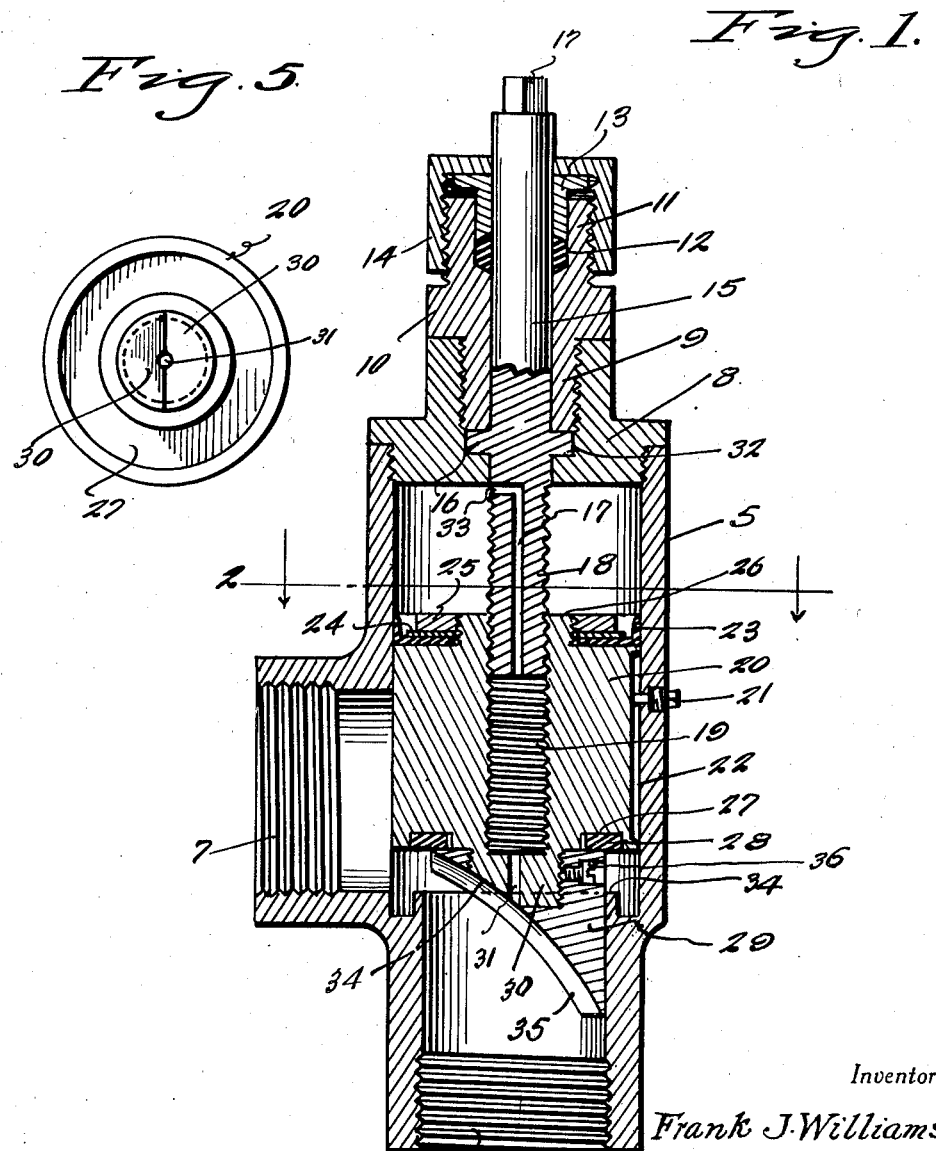
Inventor
Frank J. Williams
By Clarence A. O'Brien
Hyman Berman
Attorneys

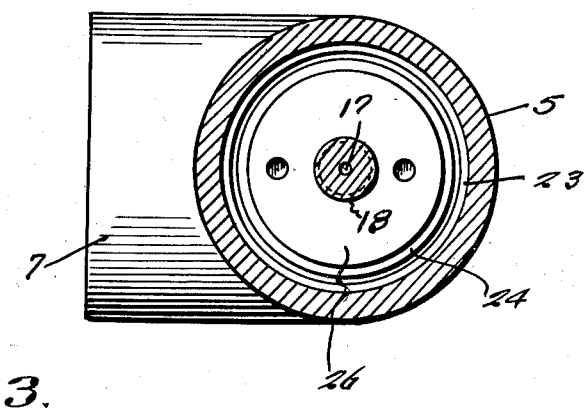
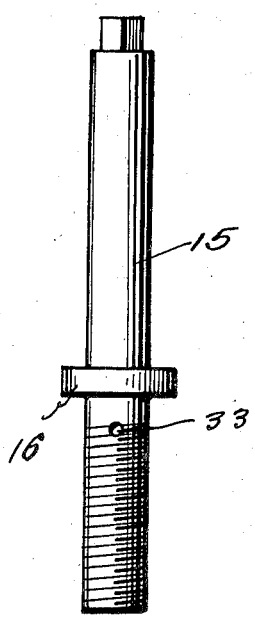
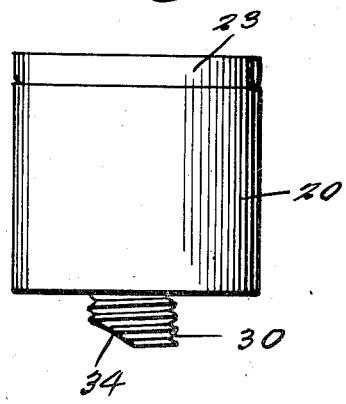

Patented Apr. 4, 1939

2,152,831

UNITED STATES PATENT OFFICE 2,152,831

VALVE

Frank J. Williams, San Fernando, Calif.

Application December 13, 1937, Serial No. 179,555

1 Claim. (Cl. 251—77)

This invention relates to valves and more particularly to water-gate valves of the cylinder type.

An object of the present invention is to provide a valve of the character mentioned having means whereby the pressure of water in the line may be used for maintaining the valve seated after the valve piston has been moved to a seated or closed position.

A further object of the invention is to provide a valve of this type so constructed as to overcome the tendency of the water pressure to unseat the valve as is now the objectionable feature generally to water-gate valves of the cylinder type.

The invention together with its objects and advantages will be best understood from a study of the following description taken in connection with the accompanying drawings wherein:

Figure 1 is a sectional view through the valve with the valve piston in an unseated position, Figure 2 is a sectional view taken substantially on the line 2—2 of Figure 1, Figure 3 is an elevational view of the valve stem, Figure 4 is an elevational view of the valve piston or core, and Figure 5 is a bottom plan view of the valve piston or core.

Referring to the drawings by reference numerals it will be seen that the valve comprises a substantially cylindrical casing 5 having an internally threaded inlet neck 6 at the lower end thereof and a lateral internally threaded outlet neck 7 extending from one side thereof.

Threaded into the upper end of the valve casing 5 is a plug 8 having a threaded socket which receives one threaded end 9 of a boxing 10 the upper externally threaded end 11 of which accommodates a packing 12 and a gland 13. Threaded on the upper end 11 of the boxing 10 is a packing nut 14 and extending through the plug 8, boxing 10, packing 12, gland 13, and nut 14 is the upper end of the valve stem 15.

Stem 15 intermediate its ends is provided with an integral collar or flange 16 which seats within a recess 17 provided therefor in the plug 8 and held in said recess through the medium of the boxing 10 in a manner to permit rotative movement of the stem 15 and at the same time prevent longitudinal movement thereof.

At its upper extremity the stem 15 is suitably formed as at 17 to accommodate a wrench or other suitable tool for rotating the stem while the lowermost end portion of the stem is threaded as at 18 complemental to an axial threaded socket or bore 19 provided therefor in the valve cylinder or core 20.

The valve core cylinder 20 is held against rotative movement and constrained to shift longitudinally within the valve casing 5 incidental to a rotative movement of the stem 15 through the medium of a guide pin 21 suitably tapped into the casing 5 and at its inner end engaging in a groove 22 provided therefor in the periphery of the valve cylinder or core 20.

On the upper end thereof the valve core of cylinder 20 is provided with a cup 23 of rubber or leather and this cup 23 is held on the piston through the medium of a washer 24 and a nut 25, nut 25 being threaded on the threaded pin 26 provided integrally with the piston 20 at the upper end of the latter.

At the bottom or lower end thereof the piston cylinder or core is provided with a circular groove 27 that accommodates a circular washer 28 that is held in position through the medium of a nut 29 threaded on a mutilated threaded pin 30 provided at the bottom or lower end of the cylinder or core 20.

The pin 30 is provided with an axial passage 31 that is in substantial alignment with an axial passage 32 provided in the threaded end of the valve stem 15 and at its upper end the passage 32 opens laterally of the threaded end of the stem as at 33.

At the inner end of the inlet 6 the valve casing 5 is provided with an internal seat 34. Thus it will be seen that when the valve is closed washer 28 on the lower end of the valve cylinder or core 20 will engage the seat 34 and the water will escape through the passages 31, 32 and 33 to exert a pressure at the top side of the cylinder or core 20 for yieldably retaining the same properly seated.

It will thus be seen that by using the water pressure for maintaining the valve cylinder 20 seated there will be no leakage obtaining at the valve.

In accordance with the present invention the nut 29 also serves as a deflector for deflecting the water as it enters the valve through the port 6 in a manner to direct the water toward and through the outlet 7; and in this connection it will be seen that nut 29 is mutilated as is also the pin 30, pin 30 and nut 29 being chamfered and the chamfered sides or portions 34, 35 respectively thereof being concave as will be clear from a study of Figures 1, 4 and 5.

Obviously to shift the valve 20 to the desired position of adjustment the stem 15 is turned in the proper direction. This turning movement of the stem 15 will cause the valve core or cylinder 20 to thread axially of the stem in the desired direction. In Figure 1 the valve is shown in a partially open position and obviously with the valve member 20 in either a fully closed position or a partially open position pressure on the valve will be equalized due to the fact that certain of the fluid or water will be permitted to escape through the passages 31, 32 33 to the top side of the valve piston or core 20 and exert a pressure thereon sufficient to insure the maintaining of the valve core of piston 20 at the desired position of adjustment whether it be in a partially open position or in a fully closed position.

It is thought that a clear understanding of the construction, utility and advantages of a valve of this character will be had without a more detailed description.

Having thus described the invention what is claimed as new is:

A valve comprising a cylinder having an inlet arranged at one end thereof and an outlet arranged intermediate the ends of said cylinder, a plug closing the end of the cylinder opposite the inlet and having a stem opening, a stem extending through the opening and flanged to seat in the plug and having the portion located in the cylinder provided with feed threads and having a passage opening outwardly through said portion at the free end thereof and through a side thereof adjacent the plug to place the portion of the cylinder between the outlet and the plug in direct communication with the inlet, a packing means receiving the stem and secured on the plug and acting to keep the flange of the stem against the plug, a seat arranged in the cylinder between the inlet and the outlet, a valve member having a threaded bore receiving the threaded portion of the stem and having a passage connecting with the bore and opening outwardly opposite the inlet, said valve member being slidable relative to the inlet and outlet and maintaining the space between the plug and the outlet closed to the latter, packing means on the valve member and contacting the cylinder, seat engaging means on the valve member to engage the seat, said valve member having a groove, and a pin on said cylinder to engage in the groove to retain the valve member against rotation during its sliding movement in the cylinder by the rotation of the stem.

FRANK J. WILLIAMS.